US012743522B2

(12) United States Patent
Rowell et al.

(10) Patent No.: US 12,743,522 B2
(45) Date of Patent: Sep. 22, 2026

(54) PREVENTING VULNERABLE CODE UPLOAD/DOWNLOAD

(71) Applicant: Charter Communications Operating, LLC, St. Louis, MO (US)

(72) Inventors: Jeffrey Murray Rowell, Aurora, CO (US); Charles James Manser, Clearwater, FL (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 23 days.

(21) Appl. No.: 18/098,075

(22) Filed: Jan. 17, 2023

(65) Prior Publication Data

US 2024/0241962 A1 Jul. 18, 2024

(51) Int. Cl.
*G06F 21/57* (2013.01)
*G06F 8/71* (2018.01)

(52) U.S. Cl.
CPC .............. *G06F 21/577* (2013.01); *G06F 8/71* (2013.01)

(58) Field of Classification Search
CPC .... G06F 21/577; G06F 8/71; G06F 2221/033; G06F 21/563
See application file for complete search history.

(56) References Cited

U.S. PATENT DOCUMENTS 7,792,963 B2 9/2010 Gould
10,459,822 B1 * 10/2019 Gondi ........................ G06F 8/75
2003/0056217 A1 3/2003 Brooks
2006/0130107 A1 6/2006 Gonder et al.
2007/0217436 A1 9/2007 Markley
2009/0248794 A1 10/2009 Helms
2010/0313236 A1 12/2010 Straub
2021/0176210 A1 * 6/2021 Chan .......................... G06F 8/65
2021/0240834 A1 * 8/2021 Trabelsi .................... G06N 3/08
2021/0286895 A1 * 9/2021 Yang ...................... G06F 21/563
2024/0144136 A1 * 5/2024 Singh ........................ G06N 5/02

FOREIGN PATENT DOCUMENTS

EP 4481605 A1 * 12/2024 ........... G06F 21/563
WO WO-2014133528 A1 * 9/2014 ........... G06F 21/563

OTHER PUBLICATIONS

Joao Polonio, Jose Moura, Rui Neto Marinheiro; "Toward Automatic Detection and Mitigation of High-Risk Cybersecurity Vulnerabilities at Networked Systems"; IEEE Access; Journal Article; Publisher: IEEE; vol. 13, Oct. 2025, pp. 181957-181976 (Year: 2025).*
Wikipedia, Common Vulnerability Scoring System, 7 pages downloaded Dec. 7, 2022 from https://en.wikipedia.org/wiki/Common_Vulnerability_Scoring_System.
Git—About Version Control—6 pages downloaded Dec. 16, 2022 from https://git-scm.com/book/ms/v2/Getting-Started-About-Version-Control.
Wikipedia, Version Control, 13 pages downloaded Dec. 15, 2022 from https://en.wikipedia.org/wiki/Version_control.

* cited by examiner

*Primary Examiner* — Fatoumata Traore
*Assistant Examiner* — Courtney D Fields
(74) *Attorney, Agent, or Firm* — Otterstedt & Kammer PLLC

(57) ABSTRACT

Obtain a command to download code from a version control system repository server. Responsive to the obtained command, quarantining the code and run a security scan on the code while it is quarantined. Based on an acceptable result of the security scan, release the quarantine and permit download of the code.

25 Claims, 3 Drawing Sheets

PREVENTING VULNERABLE CODE UPLOAD/DOWNLOAD

FIELD OF THE INVENTION

The present invention relates generally to the electrical, electronic and computer arts, and, more particularly, to computer-aided software engineering, software configuration management, computer security, and the like.

BACKGROUND OF THE INVENTION

Version control refers to management of changes to computer programs and the like. Git is a widely adopted and used version control system for storing software within a centralized code repository. Software composition analysis (SCA) is an automated process that identifies the open source vulnerabilities in code. Static application security testing (SAST), or static analysis, analyzes source code prior to compilation to find security vulnerabilities that make applications susceptible to attack. Dynamic Application Security Testing (DAST) analyzes, e.g., a web application through the front-end to locate vulnerabilities through simulated attacks.

Currently, scans may be run when code is uploaded to a version control system, but in current techniques, such scans are not updated.

SUMMARY OF THE INVENTION

Principles of the invention provide techniques for preventing vulnerable code upload/download. In one aspect, an exemplary method includes obtaining a command to download code from a version control system repository server; responsive to the obtained command, quarantining the code and running a security scan on the code while it is quarantined and, based on an acceptable result of the security scan, releasing the quarantine and permitting download of the code from the separate directory.

In another aspect, an exemplary system includes a memory; and at least one processor, coupled to the memory, and operative to carry out and/or otherwise facilitate the method steps described just above.

In still another aspect, an exemplary system includes means for obtaining a command to download code from a version control system repository server; means for, responsive to the obtained command, quarantining the code and running a security scan on the code while it is quarantined and, means for, based on an acceptable result of the security scan, releasing the quarantine and permitting download of the code from the separate directory.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a version control system repository server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

- Improves the technological process(es) of computer-aided software engineering by enhancing security;
- For example, improves technological process(es) of computer-aided software engineering by preventing not only vulnerable code upload to a repository server, but also vulnerable code download from such a server;
- For example, improves technological process(es) of computer-aided software engineering by preventing vulnerable code download from such a server in a case where vulnerabilities are now (at the time of attempted download) known/detectable but were not known/detectable at the time of upload.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
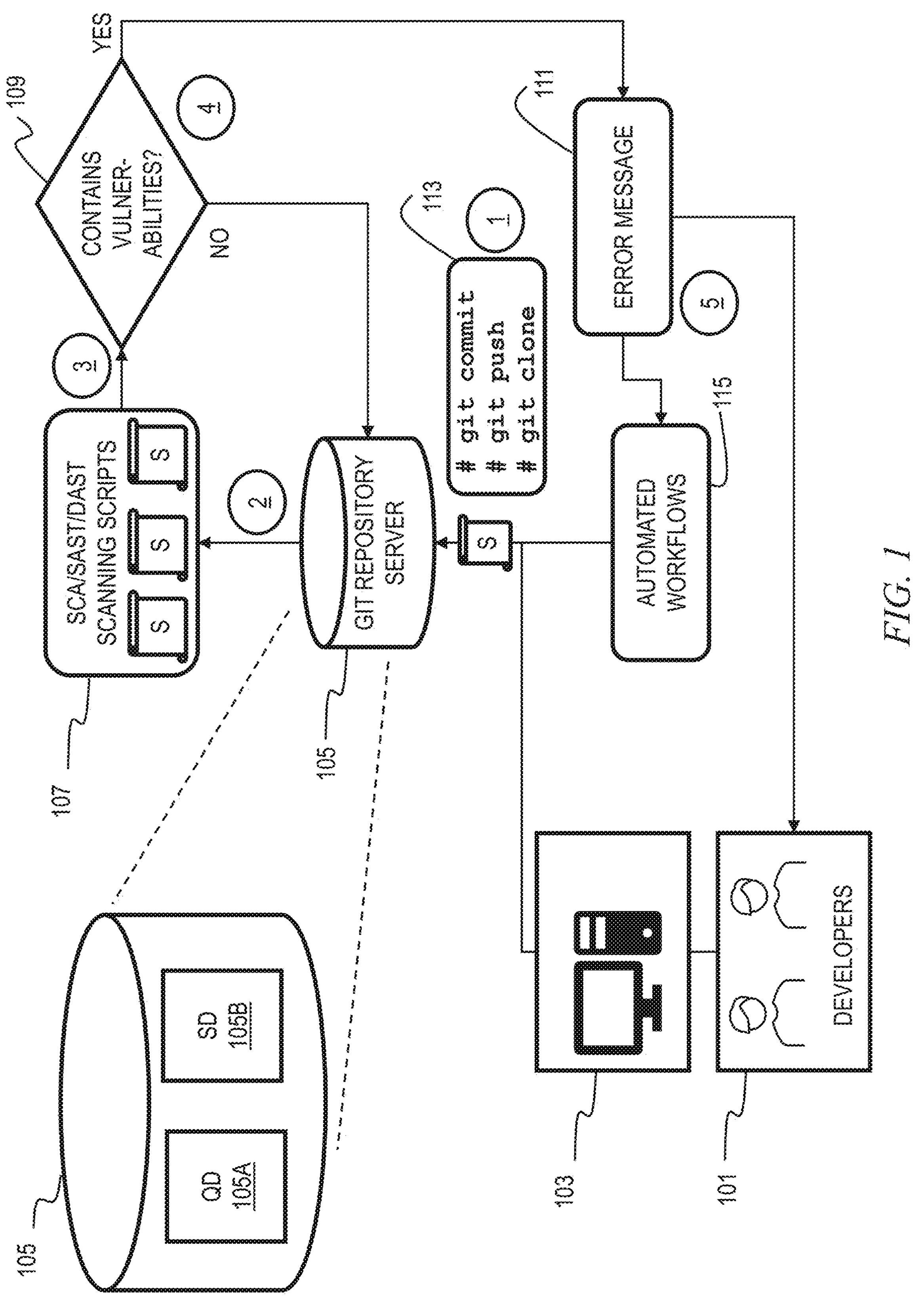
FIG. 1 is a combined block diagram and data flow diagram, according to an aspect of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

As noted, currently, scans may be run when code is uploaded to a version control system, but such scans are not updated in state-of-the-art techniques. One or more embodiments advantageously interpose code checking/scanning between a code developer's machine and a version control system, such as a Git repository.

Furthermore in this regard, it is currently known to carry out vulnerability scans as part of Git workflows, Git pipelines, and the like. A developer will typically use commands such as Git commit and Git push to publish code to a Git repository server. In current state-of-the-art systems, all of the checks and scans are run at the time of publishing the code to the repository server, and the published code resides in this Git repository server. Currently, scans are not run again; a developer can access the code one or two years later and download the code without updated checking. That is, currently, upon download, no scans are run again, meaning that developers or automated workflows could be downloading potentially vulnerable code, because there is currently no check interposed on the code download (e.g., using the Git clone command). One or more embodiments address the deficiency(ies) in the prior art, which prevents only vulnerable code upload but not vulnerable code download.

A Git repository server typically uses a protocol called Git. Within Git, there are various types of hooks that can be used in conjunction with various scanning scripts. In one or more embodiments, before code is uploaded to or downloaded from the Git repository server, the code is put into a quarantined directory. The quarantined directory can be thought of as a "sandbox" directory, where scripts can be run against the code before actually storing it or allowing download of the code. One or more embodiments impose checks (using scanning scripts, e.g.), scanning the code using SCA, SAST, and/or DAST.

In one or more embodiments, checks are carried out against a user-defined threshold. This is a threshold that is defined, for example, in one of two ways. In one aspect, the threshold is a variable that is set globally in the Git repository server, meaning every code base in the Git repository server has the same threshold defined by the variable. In another, more granular aspect, different thresholds are defined on a per-code basis. The threshold(s) is/are checked and it is determined whether the vulnerabilities are unacceptable; for example, a vulnerability score exceeds a permissible threshold. If so, an error message is returned. The error message could indicate, for example, that the developer's code is vulnerable and cannot be downloaded or uploaded as the case may be. If the threshold is not exceeded, then the command is allowed to proceed, and the upload or download will be successful. It should be noted that a determination whether a threshold is exceeded, with an error generated if exceeded, could also be carried out by determining whether the score was greater than or equal to an incrementally smaller threshold, with an error generated if equal to or exceeded. Further, it is also possible to check whether the risk score is less than a threshold, with an error generated if not less than the threshold, or to check whether the risk score is less than or equal to an incrementally higher threshold, with an error generated if not less than or equal to the threshold, etc.

Referring now to FIG. 1, in a "zeroth" step, one or more developers 101 write some code; for example, on the developer's server or on the developer's laptop or other client machine 103. A non-limiting example of such code is a Python script, but the code could be in any other programming language, e.g., JAVA, C++, and the like. Typically, this code could be source code, such as a high level code that a human can read, but the code could also be an assembler or machine language code or the like. Thus, the developer 101 develops some code, and after the developer develops his or her code, he or she desires to publish that code into a Git repository server 105. Git is a command line utility, generally common on all systems such as Windows, Mac, Linux, and the like. Referring to the exemplary commands 113, the developer 101 commits her or his code; the commit creates a version locally on the developer's machine 103. Git push publishes that version remotely on the Git repository server 105. Git clone is something that would be run at a later point, as discussed below; it refers to a download of the code from the Git repository server 105; e.g., to another developer's laptop or another piece of infrastructure within the network.

Accordingly, consider two cases; namely, what happens on a Git push and what happens on a Git clone. Each of these are denoted as a first step, indicated by an encircled numeral 1, in FIG. 1, which denotes developers 101 (or automated workflows 115) attempting to either publish (Git commit and Git push) or to download (Git clone) software from Git repository server 105.

Git push: Consider first what happens on a Git push. The code is sent to the Git repository server 105. Before it is officially published in the Git repository server 105, the code is stored in a quarantine directory 105A seen in the enlarged view of server 105. The quarantine directory functions as a sandbox; it cannot be accessed (other than for scanning). Code in the quarantine directory is not available for download. Thus, while the code is in the quarantine directory, in a second step denoted by the encircled numeral 2, scripts 107 are run, such as SCA, SAST, and/or DAST. Again, these scans are run against the code while it is in the quarantine directory. Specifically, prior to the software being published or downloaded, the Git repository server 105 sends the pushed software to a quarantine directory where one or more scanning scripts 107 look for issues in the software sought to be published/downloaded.

The quarantine directory is a built-in part of the Git protocol. While the code is in the sandbox; these security scanning scripts 107 check for things such as open source vulnerabilities and libraries that are used, insecure ways of calling different functions within the code, and the like. In one or more embodiments, these scripts 107 return, e.g., a spreadsheet or a JSON dictionary of vulnerability results. Each of those have, for example, a Common Vulnerability Scoring System (CVSS) version 2 or CVSS version 3 score. In a third step denoted by the encircled numeral 3, those CVSS scores are then checked against a user-defined threshold in decision block 109; again, that threshold can be set, for example, in two ways: (i) globally to all code bases or (ii) on a per code basis. In decision block 109, it is determined whether the CVSS score is greater than or less than or equal to the defined threshold. That is to say, the scanning scripts determine whether the software attempting to be published/downloaded contains risky or vulnerable code, based on an evaluation of the (combined) CVSS score. A decision is made whether the code is allowed to be stored (NO branch of decision block 109, i.e., no issue detected so OK to publish) and officially published in the server 105. In that case, instead of having the code only stored in the quarantine directory, it is placed in a separate directory SD 105B, seen in the enlarged view of server 105, where it is available for download. In case of failure (YES branch, i.e., there is vulnerability), an error message 111 is issued to the developer(s) 101 or automated workflows 115. The result of the decision block (NO or YES) corresponds to a fourth step designated by encircled numeral 4. If the software attempting to be published/downloaded does not contain vulnerabilities, the software is successfully stored/published to SD 105B, or successfully downloaded from, SD 105B of server 105. The error message corresponds to a fifth step designated by encircled numeral 5, wherein an error message is returned to the automated workflows and/or developers alone with a vulnerability read-out containing the vulnerability scan results.

How to set the thresholds: Given the teachings herein, the skilled person knows how to set these thresholds based on heuristics or experience—based on how much risk the organization is willing to tolerate, the skilled person, given the teachings herein, will be able to set the threshold for a given case. For example, the thresholds can be set based on company policy, often by a security operations team, or Chief Information Security Officer (CISO), who specifies, for example, that all scanned code must have a vulnerability score less than CVSS Level 8. Thus, the thresholds could be set by a security operations team. In one or more embodiments, if the code scan results are above the threshold, an error message 111 is returned, as per the YES branch of decision block 109. In one or more embodiments, this is a customizable error message. For example, it can specify one or more specific identified vulnerabilities and the relevant Common Vulnerabilities and Exposures (CVE) message and CVSS scores, as well as the specific lines of code that are actually vulnerable, and can even include links to documentation on how to resolve code vulnerabilities. Thus, one or more embodiments return a detailed message to the developers 101 (or automated flows 115 or whatever entity ran the Git Push command); the message is received after the entity runs the Git Push command in its terminal 103.

Git clone: Consider now what happens upon a Git clone; the workflow is similar to that for Git Push but runs in the opposite direction. Thus, Git clone occurs, instead of when uploading the code, when the code is being downloaded. The Git clone is run against a code base that is already uploaded into server 105 and available for download. When the Git clone command is received by the Git repository server 105, in essence, the same thing happens as in the case of Git Push. The code that had been requested for download is put back into the quarantine directory 105A, the scripts 107 are run, and the scripts produce CVSS scores. The CVSS scores are checked against the vulnerability threshold in decision block 109, and a decision is made according to that vulnerability threshold: the code is either stored in SD 105B and cleared for download to the machine 103 or an error message is returned.

Still considering Git clone, for example, suppose there are two developers, Developer A and Developer B. Developer A might push his or her code and the code might go through all the security scans/checks and be stored available for download. Developer B may come through one or two years later and desire to access Developer A's code using a Git clone command. In the prior art, no checking is done on the Git clone command, which means that vulnerabilities could have grown and accrued in the code base over that 1-2 year period. Meanwhile, the ability to detect them and/or the awareness of them may have improved during that same window.

Thus, a pertinent problem in the prior art lies in the Git clone command; in the prior art, code is only checked once; there is no ongoing checking as new information becomes available about vulnerabilities. One or more embodiments address this problem with the cloning aspect. Indeed, one or more embodiments improve the technological process of computer-aided software engineering by enhancing security. In one or more embodiments, in the event that an error message 111 occurs, refrain from utilizing the code, or undertake suitable remediation on the code to remove the problematic segments. Then, in one or more embodiments, rescan the corrected code and if now passes decision block 109, then deploy it.

Figure 2:
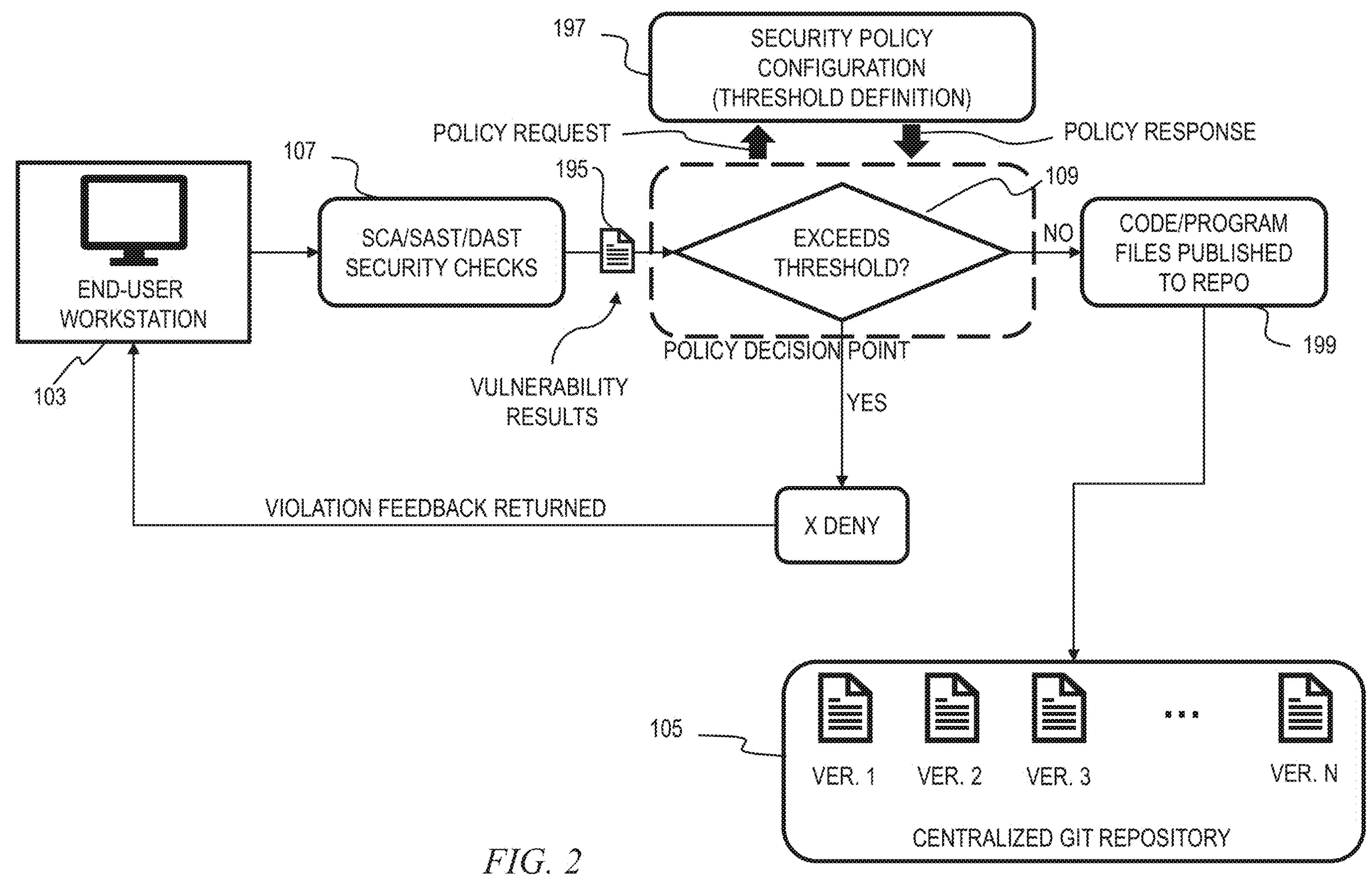
FIG. 2 is an alternative combined block diagram and data flow diagram, according to an aspect of the invention.

FIG. 2 shows an alternative view similar to FIG. 1, including previously-discussed elements 103, 105, 107, 109. The vulnerability results 195 of the checks 107 are shown being provided to the decision block 109 (which here is depicted as specifically checking whether a threshold is exceeded). Decision block 109 is depicted as based on threshold definition 197; the logic of block 109 can request a policy and receive a policy response as shown. Element 199 represents code/program files that pass the check and are published to repository 105 (or made available for download). Repository 105 is shown as containing Versions 1, 2, 3, . . . , N. The YES/Deny branch of block 109 corresponds to the error message branch in FIG. 1.

Thus, one or more embodiments provide techniques for preventing vulnerable code upload and/or download to/from a Git code repository or the like, where the vulnerability severity of the code exceeds a certain user-defined threshold. Git is a widely adopted and used version control system for storing software within a centralized code repository. One or more embodiments provide techniques for integrating security into the Git protocol by way of interjecting a security evaluation step in the middle of common Git commands such as "git clone," "git commit," and "git push." Exemplary techniques are implemented, for example, in the process flow in-between the end user interacting with the code (i.e., the user running the git commands mentioned earlier) and the centralized code repository that maintains the version-controlled software.

One or more embodiments provide a series of security code analysis checks ranging from Software Composition Analysis (SCA) to identify open source vulnerabilities, Static Application Security Testing (SAST) to identify code vulnerability flaws, and Dynamic Application Security Testing (DAST). After the series of security code analysis checks the results are differenced against a user-defined vulnerability threshold level that is stored within the code repository, and one or more embodiments prevent or deny the respectful Git command(s) based on the evaluation of the vulnerability results from the series of security checks against the user-defined vulnerability threshold level.

Principles of the present disclosure are described herein in the context of apparatus, systems, and methods for preventing vulnerable code upload/download; responsive to such evaluation, code with vulnerabilities can be quarantined and/or remediated. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Recapitulation

Given the discussion thus far, it will be appreciated that, in general terms, an exemplary method, according to an aspect of the invention, includes the step of obtaining a command to download code from a version control system repository server 105. The code is typically previously uploaded code; for example, uploaded some significant amount of time ago, such as one or two years ago (typically, a significant time period can be one in which the results of a security scan on code may change due to new information becoming available). For example, Git clone refers to a request for a download of the code from the Git repository server 105; e.g., to another developer's laptop, also represented by 103, or to another piece of infrastructure within the network. Note that embodiments are not limited to using Git. Client 103 and server 105 can communicate, for example, using the TCP/IP protocol suite. Furthermore, for the avoidance of doubt, regarding "obtaining a command to download code from a version control system repository server 105," "from" refers to where the code is to be downloaded from and not the source of the command; the command could be obtained, for example, at the version control system repository server 105 from a putative user of the code sought to be downloaded.

A further step includes, responsive to the obtained command, quarantining the code and running a security scan on the code while it is quarantined. For example, responsive to the obtained command, place the code in a quarantine directory 105A and run a security scan on the code while it resides in the quarantine directory. This step can be carried out, for example, using logic on the server 105 including scripts 107. Scripts 107 can include, for example, bash shell scripts, Python, Perl, JavaScript, or scripts implemented in any other suitable programming language. The skilled artisan will appreciate that other approaches to quarantining are possible.

An even further step includes, based on an acceptable result of the security scan, releasing the quarantine and permitting download of the code. For example, based on an acceptable result of the security scan, move the code to a separate directory 105B and permit download of the from the separate directory. This step can be carried out, for example, using logic on the server 105. The skilled artisan will appreciate that other approaches to releasing the quarantine are possible.

Note that in general, "logic on the server 105" can include logic in the scripts 107, other logic implemented in software, hardware, and/or firmware, or a combination of both.

In one or more embodiments, running the security scan yields a vulnerability score (e.g., a Common Vulnerability Scoring System (CVSS) version 2 or CVSS version 3 score), and a further step includes comparing the vulnerability score to a threshold. In this aspect, the acceptable result of the security scan is based on the comparison of the vulnerability score to the threshold. Note that decision block 109 is depicted in FIG. 2, as based on threshold definition 197; the logic of block 109 can request a policy and receive a policy response as shown. This aspect can be implemented, for example, using logic on the server 105; for example, logic programmed into the scripts 107.

The acceptable result of the security scan can be based, for example, on the vulnerability score not exceeding the threshold, and the threshold can be, for example, a maximum permissible value of the vulnerability score.

Of course, unacceptable results of a security scan are also possible. For example, the command to download the code could be a first such command and the code could be first code, and the steps could be repeated for second code; namely, obtaining a second command to download second code from the version control system repository server; responsive to the obtained second command, placing the second code in the quarantine directory and running a security scan on the second code while it resides in the quarantine directory; and based on an unacceptable result of the security scan, refraining from moving the second code to the separate directory, and refusing download of the second code.

As noted, global and per-code thresholds are possible. For example, in the case of a global threshold, running the security scan on the first and second code yields first and second vulnerability scores, and further steps include comparing the first vulnerability score to a threshold and comparing the second vulnerability score to the (same) threshold. The acceptable result of the security scan on the first code is based on the comparison of the first vulnerability score to the threshold and the unacceptable result of the security scan on the second code is based on the comparison of the second vulnerability score to the threshold. On the other hand, in the case of per-code thresholds, running the security scan on the first and second code yields first and second vulnerability scores, and further steps include comparing the first vulnerability score to a first threshold and comparing the second vulnerability score to a second threshold, different than the first threshold. The acceptable result of the security scan on the first code is based on the comparison of the first vulnerability score to the first threshold and the unacceptable result of the security scan on the second code is based on the comparison of the second vulnerability score to the second threshold.

Various action can be taken when the scan yields unacceptable results. For example, in one or more embodiments, based on the unacceptable result of the security scan: remediate at least one security issue with the second code; run a security scan on the remediated second code while it resides in the quarantine directory 105A; and, based on an acceptable result of the security scan on the remediated second code, move the remediated second code to the separate directory 105B and permit download of the remediated second code from the separate directory. Once a security scan indicates a potential vulnerability, the possible vulnerability(ies) can be prioritized by understanding which vulnerabilities pose a real and significant risk, and fixing the same by patching, blocking, or otherwise fixing vulnerabilities.

Of course, an end user can ultimately make use of any downloaded code (original code that passes the test or remediated code), such as by compiling and deploying same for use.

In another aspect, based on the unacceptable result of the security scan on the second code, return an error message to a provider of the command to download the second code. The provider of such a message could be, for example, developer(s) 101 (or automated flows 115 or whatever entity ran the Git Push command). The error message could be generated by logic on server 105 and sent via TCP/IP, for example. An automated workflow is any type of software using Continuous Integration and Continuous Delivery (CI/CD) functionality (Continuous integration (CI) automatically builds, tests, and integrates code changes within a shared repository; then Continuous delivery (CD) automatically delivers code changes to production-ready environments for approval; or Continuous deployment (CD) automatically deploys code changes to customers directly). Given the teachings herein, the skilled artisan can utilize existing CI/CD functionality to implement one or more embodiments; for example, using CI/CD features that already exist and come built-in as part of the Git repository server 105.

Various types of content can be included in the error message. For example, in some cases, the error message includes at least one specific identified vulnerability, a Common Vulnerability Scoring System (CVSS) score, and an identification of specific lines of code that are vulnerable. The CVSS scores can be generated, for example, by way of identifying the software library version and carrying out a search for vulnerabilities related to that software library version.

In one or more embodiments, the error message further includes at least one link to documentation on how to resolve the at least one specific identified vulnerability. For example, the generation of the error message containing a link to documentation can be programmed into the scripts 107 where the link is hard coded in the script.

A variety of techniques can be used for security scanning. For example, running the security scan can include employing a script to carry out at least software composition analysis (SCA); employing a script to carry out at least static application security testing (SAST); and/or employing a script to carry out at least dynamic application security testing (DAST).

As noted above, one or more embodiments include the step of obtaining a command to download code from a version control system repository server 105, and the code is typically previously uploaded code—for example, uploaded one or two years ago. Thus, one or more embodiments further include the previous uploading process. Indeed, one or more embodiments include, prior to obtaining the command to download the code from the version control system repository server: obtaining a command to upload the code to the version control system repository server (for example, Git commit is followed by Git push); responsive to the obtained command to upload the code, placing the code in the quarantine directory 105A and running a security scan on the code while it resides in the quarantine directory; and, based on an acceptable result of the security scan, moving the code to the separate directory 105B.

In a typical (but non-limiting) exemplary case, the command to upload the code is received from a developer 101 and the command to download the code is received from a user, different than the developer. Note, however, that developers 101 and developers' machine 103 are equally representative of one or more end code users and corresponding machine(s).

As noted, unacceptable results of a security scan are also possible. For example, it is possible that first code might be uploaded successfully and then later downloaded successfully, while second code might be uploaded successfully and then later fail scanning when a request is made to download it. Thus, in one or more embodiments, the command to download the code is a first download command, the command to upload the code is a first upload command, and the code is first code, and the method further includes obtaining a second upload command to upload second code to the version control system repository server; and, responsive to the obtained second upload command to upload the second code, placing the second code in the quarantine directory and running an intake security scan on the second code while it resides in the quarantine directory. The method still further includes, based on an acceptable result of the intake security scan on the second code, moving the second code to the separate directory; after the acceptable result of the intake security scan on the second code, and the moving of the second code to the separate directory, obtaining a second download command to download the second code from the version control system repository server; responsive to the obtained second download command, placing the second code in the quarantine directory and running a download security scan on the second code while it resides in the quarantine directory; and, based on an unacceptable result of the download security scan on the second code, refraining from moving the second code to the separate directory, and refusing download of the second code.

For example, such a scenario could occur when the download security scan on the second code takes into account new vulnerability information not available for the intake security scan on the second code. For example, the second code is "OK" when uploaded but fails when an attempt is made later on to download it. Say, there is new vulnerability information available in the intervening time, better detectability and/or awareness of certain code being vulnerable has improved/changed during that same window (e.g., a new threat develops), or the like.

In another aspect, an exemplary system (e.g., a version control system repository server 105) includes a memory 730; and at least one processor 720, coupled to the memory, and operative to carry out or otherwise facilitate any one, some, or all of the method steps described herein.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 3:
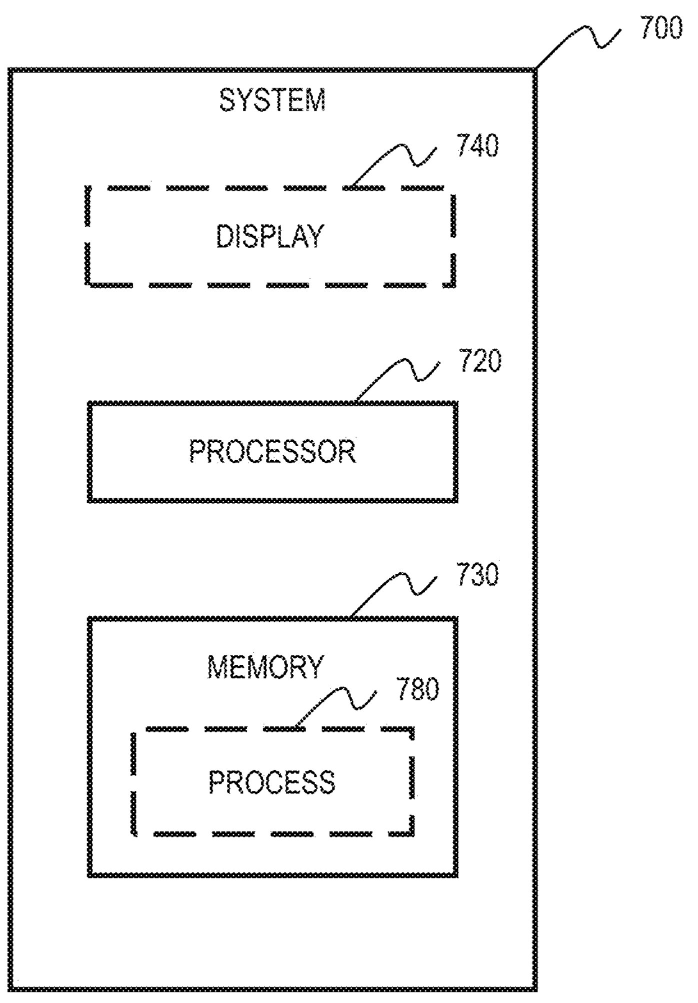
FIG. 3 is a block diagram of a computer system useful in connection with one or more aspects of the invention.

FIG. 3 is a block diagram of at least a portion of an exemplary system 700 that can be configured to implement at least some aspects of the invention, and is representative, for example, of one or more of the apparatus or modules shown in the figures (e.g., a version control system repository server 105). As shown in FIG. 3, memory 730 configures the processor 720 to implement one or more methods, steps, and functions (collectively, shown as process 780 in FIG. 3). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

performing an initial security scan of code;

storing the initially security scanned code in a version control system repository server as published code;

obtaining a command to download the published code from the version control system repository server;

quarantining the published code and running a subsequent security scan on the published code in response to the obtaining of the command to download the published code and while it is quarantined, wherein the published code and the initially security scanned code is the same code; and based on an acceptable result of the subsequent security scan, releasing the quarantine and permitting download of the initially security scanned code by allowing the command to download to proceed;

wherein the acceptable result of the subsequent security scan is based on a threshold, wherein the threshold is selected specifically for the initially security scanned code.

2. The method of claim 1, wherein:

quarantining the published code and running the subsequent security scan on the published code while it is quarantined comprises placing the published code in a quarantine directory and running the subsequent security scan on the published code while it resides in the quarantine directory; and releasing the quarantine and permitting download of the initially security scanned code comprises moving the initially security scanned code to a separate directory and permitting download of the initially security scanned code from the separate directory.

3. The method of claim 2, wherein running the security scan yields a vulnerability score, further comprising:

comparing the vulnerability score to the threshold, wherein the acceptable result of the subsequent security scan is based on the comparison of the vulnerability score to the threshold.

4. The method of claim 3, wherein the acceptable result of the subsequent security scan is based on the vulnerability score not exceeding the threshold, the threshold comprising a maximum permissible value of vulnerability score.

5. The method of claim 2, wherein the command to download the published code comprises a first command and the published code comprises first code, further comprising:

obtaining a second command to download second code from the version control system repository server;

responsive to the obtained second command, placing the second code in the quarantine directory and running a security scan on the second code while it resides in the quarantine directory; and based on an unacceptable result of the security scan on the second code, refraining from moving the second code to the separate directory, and refusing download of the second code.

6. The method of claim 5, wherein the threshold comprises a first threshold and wherein running the security scan on the first and second code yields first and second vulnerability scores, further comprising comparing the first vulnerability score to the first threshold and comparing the second vulnerability score to a second threshold, different than the first threshold, wherein the acceptable result of the security scan on the first code is based on the comparison of the first vulnerability score to the first threshold and the unacceptable result of the security scan on the second code is based on the comparison of the second vulnerability score to the second threshold.

7. The method of claim 5, further comprising, based on the unacceptable result of the security scan on the second code:

remediating at least one security issue with the second code;

running a security scan on the remediated second code while it resides in the quarantine directory; and based on an acceptable result of the security scan on the remediated second code, moving the remediated second code to the separate directory and permitting download of the remediated second code from the separate directory.

8. The method of claim 5, further comprising, based on the unacceptable result of the security scan on the second code, returning an error message to a provider of the command to download the second code.

9. The method of claim 8, wherein the error message includes at least one specific identified vulnerability, a Common Vulnerability Scoring System (CVSS) score, and an identification of specific lines of code that are vulnerable.

10. The method of claim 9, wherein the error message further includes at least one link to documentation on how to resolve the at least one specific identified vulnerability.

11. The method of claim 2, wherein running the security scan comprises employing a script to carry out at least software composition analysis (SCA).

12. The method of claim 2, wherein running the security scan comprises employing a script to carry out at least static application security testing (SAST).

13. The method of claim 2, wherein running the security scan comprises employing a script to carry out at least dynamic application security testing (DAST).

14. The method of claim 2, further comprising, prior to obtaining the command to download the published code from the version control system repository server:

obtaining a command to upload the code to the version control system repository server; and responsive to the obtained command to upload the code, placing the code in the quarantine directory and performing the initial security scan on the code while it resides in the quarantine directory;

wherein the storing of the initially security scanned code is based on an acceptable result of the initial security scan, and includes moving the uploaded code to the separate directory.

15. The method of claim 14, wherein the command to upload the code is received from a developer and the command to download the published security scanned code is received from a user, different than the developer.

16. The method of claim 14, wherein the command to download the published code comprises a first download command, the command to upload the code comprises a first upload command, and the code comprises first code, further comprising:

obtaining a second upload command to upload second code to the version control system repository server;

responsive to the obtained second upload command to upload the second code, placing the second code in the quarantine directory and running an intake security scan on the second code while it resides in the quarantine directory;

based on an acceptable result of the intake security scan on the second code, moving the second code to the separate directory;

after the acceptable result of the intake security scan on the second code, and the moving of the second code to the separate directory, obtaining a second download command to download the second code from the version control system repository server;

responsive to the obtained second download command, placing the second code in the quarantine directory and running a download security scan on the second code while it resides in the quarantine directory; and based on an unacceptable result of the download security scan on the second code, refraining from moving the second code to the separate directory, and refusing download of the second code.

17. The method of claim 16, wherein the download security scan on the second code takes into account new vulnerability information not available for the intake security scan on the second code.

18. A non-transitory computer readable medium comprising computer executable instructions which when executed by a computer cause the computer to perform a method comprising:

performing an initial security scan of code;

storing the initially security scanned code in a version control system repository server as published code;

obtaining a command to download the published code from the version control system repository server;

quarantining the published code and running a subsequent security scan on the published code in response to the obtaining the command to download the published code and while it is quarantined, wherein the published code and the initially security scanned code is the same code; and based on an acceptable result of the subsequent security scan, releasing the quarantine and permitting download of the initially security scanned code by allowing the command to download to proceed;

wherein the acceptable result of the subsequent security scan is based on a threshold, wherein the threshold is selected specifically for the initially security scanned code.

19. The non-transitory computer readable medium of claim 18, wherein, in the method performed by the computer:

quarantining the published code and running the subsequent security scan on the published code while it is quarantined comprises placing the published code in a quarantine directory and running the subsequent security scan on the published code while it resides in the quarantine directory; and releasing the quarantine and permitting download of the initially security scanned code comprises moving the initially security scanned code to a separate directory and permitting download of the initially security scanned code from the separate directory.

20. A system comprising:

a memory; and at least one processor, coupled to the memory, and operative to:

perform an initial security scan of code;

store the initially security scanned code in a version control system repository server as published code;

obtain a command to download published code from the version control system repository server;

quarantine the published code and run a subsequent security scan on the published code in response to the obtaining of the command to download the published code and while it is quarantined, wherein the published code and the initially security scanned code is the same code; and based on an acceptable result of the subsequent security scan, release the quarantine and permit download of the initially security scanned code by allowing the command to download to proceed;

wherein the acceptable result of the subsequent security scan is based on a threshold, wherein the threshold is selected specifically for the initially security scanned code.

21. The system of claim 20, wherein the at least one processor is operative to:

quarantine the published code and run the subsequent security scan on the published code while it is quarantined by placing the published code in a quarantine directory and running the subsequent security scan on the published code while it resides in the quarantine directory; and release the quarantine and permit download of the initially security scanned code by moving the initially security scanned code to a separate directory and permitting download of the initially security scanned code from the separate directory.

22. The system of claim 21, wherein the at least one processor running the subsequent security scan yields a vulnerability score, and wherein the at least one processor is further operative to compare the vulnerability score to the threshold, wherein the acceptable result of the subsequent security scan is based on the comparison of the vulnerability score to the threshold.

23. The system of claim 22, wherein the acceptable result of the subsequent security scan is based on the vulnerability score not exceeding the threshold, the threshold comprising a maximum permissible value of vulnerability score.

24. The system of claim 21, wherein the command to download the published code comprises a first command and the published code comprises first code, and wherein the at least one processor is further operative to:

obtain a second command to download second code from the version control system repository server;

responsive to the obtained second command, place the second code in the quarantine directory and run a security scan on the second code while it resides in the quarantine directory; and based on an unacceptable result of the security scan on the second code, refrain from moving the second code to the separate directory, and refuse download of the second code.

25. The system of claim 24, wherein:

the threshold comprises a first threshold;

running the security scan on the first and second code yields first and second vulnerability scores;

the at least one processor is further operative to compare the first vulnerability score to the first threshold and compare the second vulnerability score to a second threshold, different than the first threshold; and the acceptable result of the security scan on the first code is based on the comparison of the first vulnerability score to the first threshold and the unacceptable result of the security scan on the second code is based on the comparison of the second vulnerability score to the second threshold.

* * * * *